Jan. 11, 1966  F. O. GADD  3,228,502
POWER SHIFT ASSIST MECHANISM FOR CLUTCHES
Filed April 7, 1964
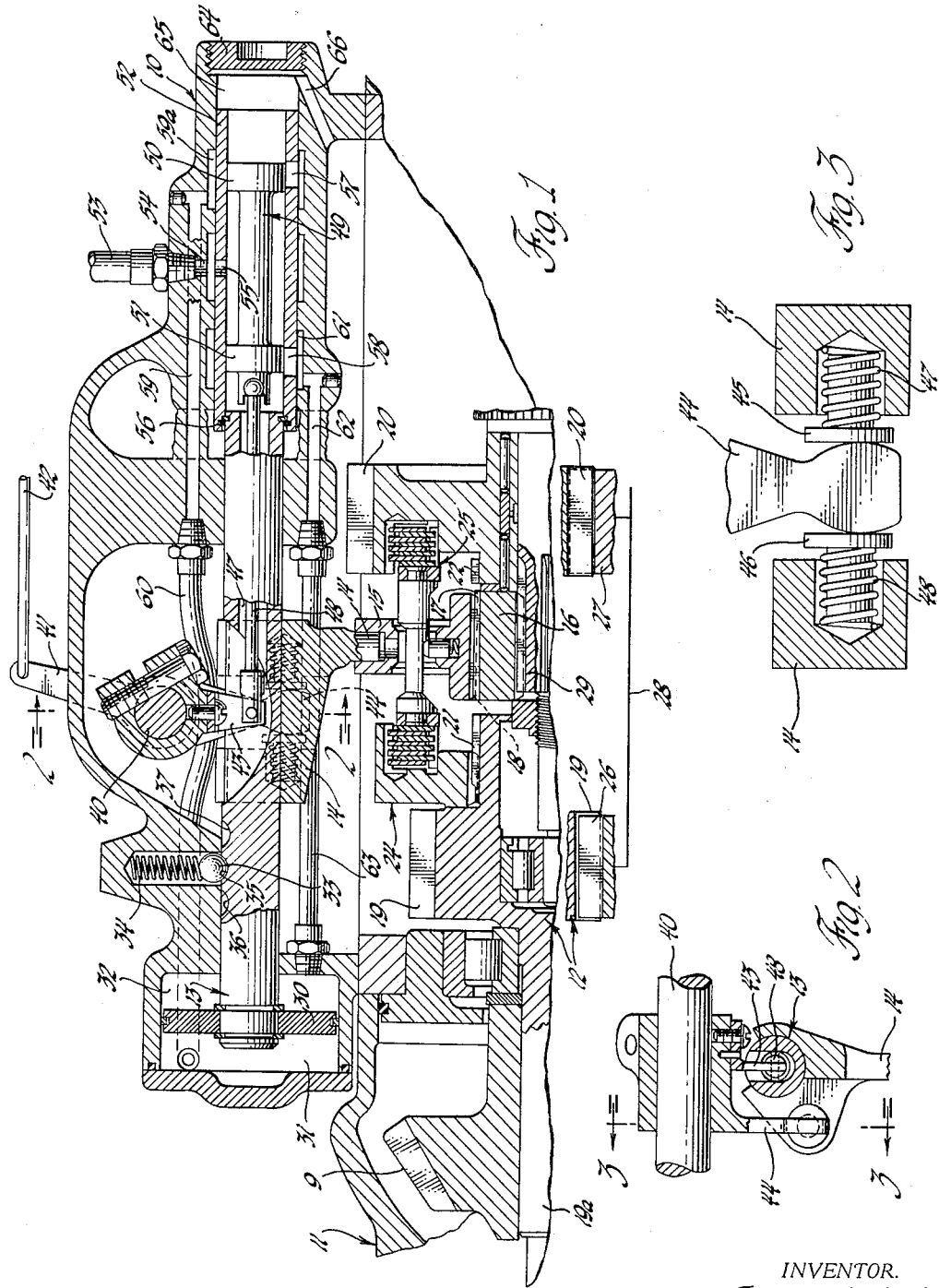
INVENTOR.
Francis O. Gadd
BY
Robert L. Spencer
ATTORNEY

United States Patent Office 3,228,502
Patented Jan. 11, 1966

3,228,502
POWER SHIFT ASSIST MECHANISM
FOR CLUTCHES
Francis O. Gadd, Birmingham, Mich., assignor to General Motors Corporation, Detroit, Mich., a corporation of Delaware
Filed Apr. 7, 1964, Ser. No. 357,889
8 Claims. (Cl. 192—87)

This invention relates to transmissions and more particularly to a power shift assist mechanism for use on manually controlled gear box transmissions.

The invention provides a hydraulically actuated servo for reducing the effort required by the operator in moving the shift lever back and forth to accomplish change of drive ratio. Oil under pressure from an engine driven pump is used as a power source, thus eliminating the need for a separate air compressor. The pump used is the same pump normally used in transmissions for lubrication purposes, thus eliminating the addition of a second pump as a pressure source.

An additional feature includes a "fail safe" structure whereby the vehicle may be operated for a limited time without oil pressure.

A further feature includes the provision of means whereby the transmission may be placed in gear when the vehicle is on a hill and whereby push start of the vehicle may be attained.

An additional feature is the provision of a simple rugged hydraulic mechanism located in the transmission cover and arranged such that all leaks and fluid discharge drain into the transmission case without external lines.

A further feature of this invention is the provision of a power shift assist unit which is self-contained in a housing adapted to be mounted upon a conventional transmission case for use either with new or previously manufactured transmissions.

An additional feature of this invention is the provision of a valve structure and control therefor effective to deliver pressure to an assist servo only when shift of ratio is called for and effective at all other times to connect the servo to exhaust.

A more particular feature of this invention is to provide a self-lapping valve structure normally effective to connect a pair of servo control chambers to exhaust, effective when shift of drive ratio is called for to deliver pressure to one servo while maintaining the other to exhaust, and effective upon completion of change to drive ratio to connect both servos to exhaust.

A further object of this invention is to provide a power shift assist mechanism wherein the servo, shift rail and control valving are disposed in coaxial relationship to minimize space requirements particularly for installations wherein space requirements are critical.

In order to accomplish the objects and advantages of this invention, there is provided a transmission cover adapted to be mounted upon the case of a conventional transmission and wherein a single power cylinder, control valving and an axially movable shifter fork are all carried by and supported in the cover.

The structure includes automatically operable centering springs and plungers operable in connection with a shift finger to permit relative rotation of the shift finger with respect to a shifter fork to permit a control valve to be moved to deliver pressure to a servo for accomplishing shift of drive ratio. Upon completion of change of drive ratio and release of torque to a rotatable shaft, the centering springs position the valve to connect the servo to exhaust.

These and other objects and advantages of the invention will be apparent from the following specification taken in conjunction with the accompanying drawings in which:

FIGURE 1 is a partially sectional view of the manually controlled power shift assist mechanism for accomplishing change of transmission drive ratio constructed in accordance with the principles of this invention.

FIGURE 2 is a sectional view taken along the line 2—2 of FIGURE 1.

FIGURE 3 is an enlarged sectional view taken along the line 3—3 of FIGURE 2.

Referring to the drawings, there is shown a control housing 10 adapted to be mounted upon the case 11 of a conventional manually controllable gear box indicated generally at 12. An axially movable shift rail 13 has fixed thereto for movement therewith a shifter fork 14, the fork 14 extending downwardly into an annular U-shaped channel formed on the exterior of an axially movable dog clutch member 15. Member 15 is provided with suitable conventional teeth 18 mating with teeth 17 of a member 16 splined to a power delivery shaft 29. Member 15 may be moved axially with respect to member 16 to alternately connect a gear 19 or a gear 20 to member 16. Gear 19 is provided with dog teeth 21 and gear 20 is provided with dog teeth 22 adapted to mate with teeth 18 of member 15. In the position shown, clutch member 15 is disengaged from gears 19 and 20 and is in a neutral or no-drive position. A final power delivery shaft 29 may be alternately driven through suitable conventional gearing through alternate torque paths including gears 19 and 20 respectively. Gear 19 may be driven by an engine driven power input gear 9 fixed to a shaft extension 19a of gear 19. A countershaft 28 carries gears 26 and 27 in mesh with gears 19 and 20, respectively. Synchronizing clutches of conventional construction indicated at 24 and 25 are provided to assure equal speed of rotation of member 16 and gears 19 and 20, respectively, in order to avoid clash of the engaging teeth 18 of member 15 and teeth 21 and 22. As is conventional practice, gears 9 and 19 rotate as a unit, and power delivery shaft 29 may be alternately clutched directly to gear 19 or to the countershaft gearing through gear 20.

As best shown in FIGURE 1, shift rail 13 carries at one end thereof a piston 30 disposed in a chamber formed by housing 10 and dividing the chamber into control chambers 31 and 32 at opposite sides of piston 30. A ball 33 loaded by a spring 34 seated in housing 10 cooperates with recesses 35, 36, and 37 to yieldably retain shift rail 13 against axial motion with respect to the housing.

A manually controllable cross shaft 40 is supported for rotation with respect to housing 10 by means of an arm 41 and suitable linkage 42. Arm 41 is fixed to cross shaft 40 and link 42 is connected to a conventional driver operable shift lever (not shown). Depending from cross shaft 40 and rotatable with shaft 40 are a valve operating finger 43 and a shifter yoke operating finger 44. As best shown in FIGURE 3, finger 44 extends into shifter yoke 14 into contact with plunger 45 and 46. Springs 47 and 48 bias the plunger 45 and 46, respectively, into contact with finger 44. Plungers 45 and 46 normally serve to center yoke 14 with respect to shift finger 44 when no load is applied to shaft 40. However, when torque tending to rotate shaft 40 is applied to the shaft, plungers 45 and 46 permit initial limited angular motion of finger 44 with respect to yoke 14 prior to axial motion of the yoke.

As best shown in FIGURE 1, shift rail 13 has a portion thereof drilled out to form a passage 47 therethrough for receiving a rod 48 secured to valve operating finger 43 and to a spool valve 49. Valve 49 includes spaced lands 50 and 51 disposed in an axially movable cylindrical sleeve 52 fixed to one end of shift rail 13. A fluid pressure supply passage 53 connected to the pressure discharge side of a transmission driven oil pump (not shown) delivers pressure of the order of 60 to 70 pounds per square inch to the space between lands 50 and 51 through a port 54 in housing 10 and a port 55 in sleeve 52, respectively. Sleeve 52 is connected to shift rail 13 for axial motion therewith by means of snap rings 56. Additional ports 57 and 58 are provided in sleeve 52.

Control chamber 31 is connected to port 57 by means of a pipe 60 and a passage 59, the passage 59 being connected to port 57 by an annular port 59a formed in housing 10. Chamber 32 is connected to port 58 by means of a pipe 63 and a passage 62 connected to port 58 by means of an annular port 61 formed in housing 10. An end plug 64 in housing 10 forms a chamber 65 at one side of land 50, the chamber 65 being connected to the interior of transmission case 11 by means of a passage 66 formed in housing 10.

In operation, considering the vehicle engine to be in operation so that fluid pressure is supplied through pipe 53 to valve 49, shift of drive ratio will be accomplished hydraulically.

With the transmission in neutral, as illustrated in FIGURE 1, no torque is applied to shaft 40, spring biased plungers 45, 46 will position shift finger 44 in a predetermined center position in its possible path of travel with respect to yoke 14. Shaft 40 and valve control finger 43 acting through rod 48 will thereby position valve 49 to block off pressure from control chambers 31, 32 and connect these chambers to exhaust. Assume that arm 41 is rotated counterclockwise by operation of manually controlled linkage 42 by the vehicle operator. Such counterclockwise rotation of shaft 40 will result in counterclockwise rotation of shift finger 44 and valve actuating finger 43. Due to resistance to axial movement of shift rail 13 provided by detent ball 33, the rail and yoke 14 will initially remain stationary and plunger 45 will move axially with respect to yoke 14 and compress spring 47. This lost motion between shift finger 44 and yoke 14 will permit initial limited angular rotation of shaft 40 and valve actuating finger 43 without accomplishing shift of transmission drive ratio. Counterclockwise rotation of shaft 40 and finger 43 will move valve 49 to the right as viewed in FIGURE 1, to admit fluid under pressure from passage 53 to chamber 31 and to connect chamber 32 to exhaust. Fluid pressure is conducted to chamber 31 by way of ports 54, 55, port 59a, passage 59 and pipe 60. Chamber 32 is connected to exhaust by way of pipe 63, passage 62, port 58 and passage 47 in shift rail 13. Servo piston 30 will thereupon move shift rail 13 to the right, as viewed in FIGURE 1, to cause shift finger 44 to move yoke 14 to the right to engage clutch teeth 18 of clutch member 15 to clutch teeth 22 of gear 20. This will accomplish reduction drive in the transmission. Ball detent 33 will fall into pocket 36 to help retain the transmission in second gear drive.

It is to be noted that once shift of drive ratio is accomplished, sleeve 52, which is axially movable with shift rail 13, will be positioned with respect to lands 50 and 51 such that chambers 31 and 32 are both connected to exhaust. Whenever cross shaft 40 is not under load, springs 47 and 48 through plungers 45 and 46 act on shift finger 44 to center the finger 44 with respect to yoke 14. With finger 44 so centered, valve finger 43 is positioned to place valve 49 to block off flow of fluid from passage 53 to chambers 31 and 32 and connect passages 62 and 59 to exhaust. Chamber 31 is connected to exhaust by way of pipe 60, passage 59, port 59a, port 57, chamber 65 and passage 66. Chamber 32 is connected to exhaust by way of passage 63, passage 62, ports 61, 58 and passage 47.

Considering the shaft 40 to be rotated clockwise to accomplish shift, detent ball 33 will prevent initial axial motion of shift rail 13 to the left as viewed in FIGURE 1. Shift finger 14 will initially rotate a limited amount with respect to yoke 14, compressing spring 48. Finger 13 will move valve 49 to the left to admit pressure from passage 53 to chamber 32 and to connect chamber 31 to exhaust. Pressure is admitted to chamber 32 by way of passage 53, port 55, ports 58, 61, passage 62 and pipe 63. Chamber 31 is connected to exhaust by way of pipe 60, passage 59, ports 59a, 57, chamber 65 and passage 66.

Upon movement of shift rail 13 to the left to accomplish engagement of clutch teeth 18 and 21, valve sleeve 52 will be moved to the left with respect to valve 49 to connect both chambers 31 and 32 to exhaust. Chamber 31 will remain connected to exhaust as described, through ports 59a, 57, chambers 65 and passage 66. Chamber 32 will be connected to exhaust through passage 63, passage 62, ports 61, 58 and passage 47 in shift rail 13.

It will be understood that with the transmission conditioned for neutral, as shown in FIGURE 1, both control chambers 31 and 32 will normally be connected to exhaust by valve 49. Chamber 32 will be connected to exhaust through pipe 63, passage 62, ports 61, 58 and passage 47 in shift rail 13. Control chamber 31 will be connected to exhaust through pipe 60, passage 59, ports 59a, 57, chamber 65 and passage 66.

It is only when pressure is applied to cross shaft 40 calling for a shift of ratio that valve 49 is effective to deliver pressure to one or the other of control chambers 31 or 32. Upon accomplishment of shift of ratio, the self-lapping effect of valve 49 and sleeve 52 movable with the shift rail automatically connects both servo chambers to exhaust. When no torque is applied to cross shaft 40, centering springs 47, 48 acting through plungers 45 and 46 and shift finger 44, automatically cross shaft 40 and valve finger 43 to position valve 49 to connect both servo chambers 31 and 32 to exhaust.

Considering the condition of operation in the event of failure of pressure supply as might happen with a stalled engine, change of drive ratio may still be had purely mechanically and without power shift assist. Clockwise rotation of cross shaft 40 will move shift finger 44 and plunger 46 to move yoke 14 and clutch member 15 to engage clutch teeth 18, 21. Movement of cross shaft 40 counterclockwise will move shift finger 44 and plunger 45 to move yoke 14 and clutch member 15 to engage clutch teeth 18–22.

This fail safe feature is important in that it permits the transmission to be put in gear for push start of the vehicle engine and also permits the vehicle to be operated in the event of pressure failure for any reason.

The action of springs 47, 48 acting upon plungers 45, 46 and shift finger 44 automatically centers finger 44 with respect to shifter yoke 14, thereby rotating shaft 40 and valve actuating finger 43 to position valve 49 to connect both chambers 31 and 32 to exhaust. Thus, pressure is normally blocked off from chambers 31 and 32 and these chambers are normally both connected to exhaust. It is only when torque is applied to shaft 40 calling for a change of drive ratio that pressure is delivered to one or the other of the servo chambers. Upon completion of change of ratio, sleeve 52 is moved by shift rail 13 to a position with respect to valve 49 such that the servo chambers 31 and 32 are each connected to exhaust.

The arrangement whereby both servo chambers 31 and 32 are normally connected to exhaust and are alternately connected to pressure for accomplishing change of drive ratio is of importance in that it minimizes fluid leakage problems common to structures wherein fluid pressure is maintained in the servo after shift of ratio is accomplished. In the event of any fluid leakage past the valve lands 50, 51, this leakage will be unable to build up any pressure in either servo since both servos will remain conected to exhaust at all times except such times as change of ratio is called for. Thus, undesired ratio changes are completely eliminated.

The coaxial arrangement of the servo piston 30 at one end of shift rail 13 and the valve structure and rod 48 and shift rail 13 makes possible a compact arrangement and makes possible a housing of low profile height and minimum width readily adapted to be mounted on transmission for use in installations where space requirements are critical. In addition, the fluid pressure supply passages for the servo chambers and the exhaust passages for discharge of fluid are all internal of the detachable housing 10. This eliminates external fluid leakage problems since all fluid is discharged directly into the transmission case from the control housing.

I claim:

1. In a transmission having a clutch member adapted to be selectively moved in opposite directions from a neutral position to establish different transmission drive ratios, a housing, a shift rail in said housing, a shifter fork fixed to said rail and operably connected to said clutch member, a fluid pressure responsive servo member fixed to said shift rail, control chambers at opposite sides of said servo member, a rotatable shaft supported for rotation in said housing, a shift finger fixed to said shaft, yieldable means connecting said shift finger to said yoke and normally effective to position said shift finger in a predetermined position with respect to said yoke, second yieldable means for opposing motion of said shift rail upon initial rotation of said shaft, a first valve member fixed to said shift rail for movement with said rail, a second valve member movable with respect to said first valve member, a valve control finger fixed to said shaft, means connecting said second valve member to said shift finger, passages connecting said control chambers, respectively, to said first valve member, a fluid pressure source connected to said second valve member, said second valve member being effective when said shift finger is disposed in said predetermined position to connect both of said control chambers to exhaust, said valve control finger being movable upon initial rotation of said shaft to displace said second valve member with respect to said first valve member to selectively connect one or the other of said control chambers to said pressure source, and said first valve member being movable by said shift rail to render said second valve member effective to connect both of said control chambers to exhaust upon completion of change of transmission drive ratio.

2. In a transmission having a clutch member adapted to be moved in opposite directions from a neutral position to establish different drive ratios, a housing, a movable shift rail in said housing, a shifter fork fixed to said shift rail and operably connected to said clutch member, said housing forming a chamber, fluid pressure responsive means fixed to said shift rail dividing said chamber into first and second control chambers, respectively, yieldable means resisting motion of said shift rail, a cylindrical valve sleeve fixed to said shift rail for axial motion therewith, a valve disposed in said sleeve, a fluid pressure source connected to said valve, passage means connecting said valve to said first and second control chambers, respectively, a rotatable shaft, a shift finger fixed to said shaft, lost motion means operatively connecting said shift finger to said yoke and including spring means normally effective to position said shift finger in a predetermined position with respect to said yoke, a valve control finger fixed to said shaft, means connecting said valve control finger to said valve, said valve control finger being effective to position said valve to connect both of said control chambers to exhaust when said shift finger is disposed in said predetermined position by said lost motion means, said valve being movable in response to initial rotation of said shaft to deliver fluid pressure to one or the other of said control chambers depending upon the direction of rotation of said shaft, and said valve sleeve being movable by said shift rail to render said valve effective to connect both of said control chambers to exhaust upon completion of change of drive ratio.

3. In a transmission having a clutch member adapted to be moved to different positions to accomplish a change of drive ratio, a housing, an axially movable shift rail in said housing, a shifter fork fixed to said shift rail and operably connected to said clutch member, a chamber formed by said housing, fluid pressure responsive means connected to said shift rail and disposed in said housing chamber, said fluid pressure responsive means forming with said housing first and second control chambers adapted to receive fluid pressure, yieldable detent means effective to resist initial axial motion of said shift rail, an axially movable valve sleeve carried by said shift rail and axially movable therewith, a valve disposed in said valve sleeve, a rotatable control shaft, a shift finger adapted to be rotated by said shaft, means connecting said shift finger to said yoke including yieldable lost motion mechanism, said yieldable lost motion mechanism being normally operable on said shift finger to position said shift finger in a predetermined position with respect to said yoke, a valve control finger rotatable with said shaft, means connecting said valve control finger to said valve, a fluid pressure source connected to said valve, passages connecting said valve to said first and second control chambers, respectively, said shift finger being normally effective when placed in said predetermined position to position said valve control finger and said valve to connect both of said control chambers to exhaust, said valve control finger being effective upon initial displacement of said shift finger from said predetermined position to position said valve to direct fluid pressure to one or the other of said control chambers depending upon the direction of rotation of said shaft, said valve sleeve being movable in response to movement of said shift rail to connect both of said control chambers to exhaust upon completion of change of transmission drive ratio.

4. In a transmission of the type having a clutch member movable to first and second clutch engaged positions for establishing first and second transmission drive ratios, a case containing said clutch member, a housing mounted on said case, a shift rail in said housing axially movable with respect to said housing, a chamber formed by said housing, a piston fixed to said shift rail and dividing said chamber into first and second control chambers, respectively, a shifter yoke fixed to said shift rail and operably connected to said clutch member, a valve sleeve fixed to said shift rail and axially movable with said shift rail, a valve in said sleeve axially movable with respect to said sleeve, a rotatable shaft, a shift finger rotatable with said shaft, means operably connecting said shift finger to said yoke including lost motion mechanism normally effective to center said finger with respect to said yoke, a valve control finger rotatable with said shaft and operably connected to said valve for controlling the position of said valve, a fluid pressure source connected to said valve, passage means connecting said valve to said first and second servo chambers, respectively, said lost motion means being normally effective to position said valve to connect both of said control chambers to exhaust, detent means for inhibiting said shift rail against axial motion in response to initial rotation of said shaft, said valve being initially moved by said valve control finger in response to rotation of said shaft to connect one or the other of said first and second control chambers to said pressure source depending upon the direction of rotation of said shaft, said valve sleeve being movable by said shift rail to a position to connect both of said control chambers to exhaust upon completion of change of drive ratio.

5. In a transmission of the type having an axially movable clutch member adapted to be moved from a first to a second position to change the transmission drive ratio, a case containing said slidable clutch member, a housing mounted on said case, said housing having a shift rail supported therein for axial motion with respect thereto, a shifter yoke fixed to said shift rail and operably connected to said clutch member, a chamber formed by said housing, a piston carried by said shift rail and dividing said chamber into first and second control chambers adapted to receive fluid under pressure, a valve sleeve carried by said shift rail and axially movable therewith, a passage through said shift rail, a rotatable shaft supported in said housing, a shift finger depending from said shaft for moving said yoke in response to rotation of said shaft, means inhibiting initial axial motion of said shift rail upon initial rotation of said shaft, lost motion means between said shift finger and yoke for accommodating such initial rotation of said shaft, a valve control finger rotatable with said shaft, a valve in said valve sleeve axially movable with respect to said sleeve, means connecting said valve to said sleeve and extending through said shift rail passage, a fluid pressure source connected to said valve, passage means connecting said valve to said control chambers, respectively, said lost motion means including means normally effective to position said valve to connect both of said control chambers to exhaust, said valve control finger being effective upon initial rotation of said shaft to position said valve to deliver pressure to one or the other of said control chambers depending upon the direction of rotation of said shaft, and said valve sleeve being movable in response to movement of said shift rail to connect both of said chambers to exhaust upon movement of said shift rail to a clutch engaged position, shaft shift finger being movable to mechanically move said yoke to provide change of transmission drive ratio in the event of loss of fluid pressure.

6. In a transmission having an axially movable clutch member adapted to be moved from a neutral position to either of two clutch engaged positions to establish different transmission drive ratios, a housing, an axially movable shift rail adapted to be selectively moved axially in opposite directions from a neutral position to different drive establishing positions, a shifter fork fixed to said shift rail and connected to said clutch member, said housing forming a chamber, fluid pressure responsive means fixed to said shift rail and dividing said chamber into first and second control chambers at opposite sides thereof, yieldable means resisting initial movement of said shift rail with respect to said housing, a cylindrical valve sleeve fixed to said shift rail for axial movement with respect to said housing, a valve member disposed in said sleeve and axially movable with respect to said sleeve, a fluid pressure source connected to said valve member, passages connecting said control chambers, respectively, to said sleeve, a rotatable shaft, a shift finger fixed to said shaft, yieldable means connecting said shift finger to said yoke and normally effective to position said shift finger in a predetermined position with respect to said yoke, a valve control finger fixed to said shaft, a passage in said shift rail, means disposed in said shift rail passage connecting said valve member to said valve control finger, said valve control finger being effective when said shift finger is disposed in said predetermined position to position said valve member with respect to said sleeve to connect both of said control chambers to exhaust, said valve control finger being effective upon initial rotation of said shaft to move said valve member relative to said sleeve to connect one of said control chambers to said fluid pressure source, said cylindrical sleeve being moved by said shift rail to connect both of said chambers to exhaust upon completion of the establishment of change of transmission drive ratio, said shift finger being effective to move said yoke mechanically to establish change of drive ratio upon loss of fluid pressure from said source.

7. In a transmission of the type having a transmission case and a detachable control housing supported on said case, an axially movable clutch member in said case adapted to be moved from a neutral position to either one of two clutch engaged positions to establish drive through said transmission, an axially movable shift rail in said housing, said housing forming a chamber at one end of said shift rail, a piston fixed to said shift rail and dividing said chamber into first and second control chambers at opposite sides of said piston, a valve sleeve fixed to said shift rail at the end of said rail opposite said piston for axial movement with said shift rail, a spool valve disposed within said sleeve for axial movement with respect to said sleeve and having spaced spools thereon, first and second passages connecting said control chambers, respectively, to said valve sleeve, a fluid pressure source, passage means connecting said source to the space between said spools, a port in said sleeve controlled by one of said spools for controlling admission of pressure to and exhaust of pressure from said first control chamber, a port in said sleeve controlled by the other of said spools for controlling the admission of pressure to and exhaust of pressure from said second control chamber, a shifter yoke fixed to said shift rail intermediate said piston and said valve and connected to said clutch member, a rotatable cross shaft in said case, a shift finger rotatable by said shaft, said finger being movable with respect to said yoke, spring biased means normally effective to position said shift finger in a predetermined position with respect to said yoke, a valve control finger fixed to said cross shaft, a passage in said shift rail, means axially movable in said shift rail passage connecting said shift finger to said spool valve, and means restraining initial movement of said shift rail upon initial rotation of said cross shaft, said spool valve being effective to connect both of said control chambers to exhaust when said shift finger is in said predetermined position, said spool valve being movable in response to rotation of said shaft to direct fluid pressure to one only of said control chambers determined by the direction of rotation of said shaft, and said valve sleeve being movable with respect to said spool valve in response to movement of said shift rail to connect both of said control chambers to exhaust, said shift finger being effective to move said yoke in response to rotation of said shaft upon loss of fluid pressure from said source.

8. In a transmission having an axially movable clutch member adapted to be moved in opposite directions from a neutral position to establish different drive ratios, a housing, an axially movable shift rail in said housing, a shifter fork fixed to said shift rail and operatively connected to said clutch member, said housing forming a chamber at one end of said shift rail, a piston fixed to said shift rail and dividing said chamber into first and second control chambers, respectively, a cylindrical valve sleeve fixed to said shift rail for axial motion with respect to said housing, a spool valve disposed in said sleeve for axial motion with respect to said sleeve, said spool valve having first and second spaced lands thereon, an exhaust chamber at one end of said sleeve, a fluid pressure source, a first port in said sleeve connected to said source for admitting fluid pressure to the space between said valve lands, a second port in said sleeve controlled by a first one of said valve lands, a second port in said sleeve controlled by a second of said valve lands, a first pressure exhaust passage connected to said first-mentioned exhaust chamber, a third port in said sleeve controlled by a second of said valve lands, a second fluid exhaust passage formed in said shift rail, passage means connecting said first control chamber to said second valve sleeve port, passage means connecting said second control chamber to said third valve sleeve port, a rotatable shaft in said housing adapted to be selectively rotated in opposite directions, a shift finger fixed to said shaft, yieldable means carried by said yoke for operatively connecting said shift finger to said yoke, said yieldable means comprising first and second plungers for contacting said shift fingers and first and second springs for biasing said plunger into contact with said shift finger, said plungers being normally effective to position said finger in a predetermined position with respect to said yoke, a valve control finger fixed to said shaft, means for connecting said valve control finger to said spool valve and extending through said second fluid exhaust passage, said valve control finger being positioned to position said spool valve to block off both of said control chambers from said pressure source when said shift finger is disposed in said predetermined position, said spool valve being movable to direct pressure, selectively, to said control chambers in response to rotation of said shaft, and said sleeve being movable with respect to said spool valve by said shift rail to connect both of said control chambers to exhaust upon completion of change of transmission drive ratio, said shift finger being effective to move said yoke to accomplish change of drive ratio in response to rotation of said shaft upon loss of fluid pressure from said source.

References Cited by the Examiner

UNITED STATES PATENTS 2,926,539   3/1960   Leonard _____ 74—364

FOREIGN PATENTS 869,264   5/1961   Great Britain.

DAVID J. WILLIAMOWSKY, *Primary Examiner.*